(12) United States Patent
Bech et al.

(10) Patent No.: US 11,584,664 B2
(45) Date of Patent: Feb. 21, 2023

(54) PORTABLE WATER TREATMENT SYSTEM

(71) Applicant: Guzzle H20 LLC, Hood River, OR (US)

(72) Inventors: Tyler Bech, Hood River, OR (US); Sean Couvreux, Hood River, OR (US)

(73) Assignee: Guzzle H20 LLC, Hood River, OR (US)

( * ) Notice: Subject to any disclaimer, the term of this patent is extended or adjusted under 35 U.S.C. 154(b) by 15 days.

(21) Appl. No.: 16/871,842

(22) Filed: May 11, 2020

(65) Prior Publication Data

US 2020/0361790 A1 Nov. 19, 2020

Related U.S. Application Data

(60) Provisional application No. 62/847,743, filed on May 14, 2019.

(51) Int. Cl.
*C02F 1/32* (2006.01)
*C02F 1/00* (2023.01)

(52) U.S. Cl.
CPC .............. *C02F 1/325* (2013.01); *C02F 1/002* (2013.01); *C02F 1/008* (2013.01); *C02F 2201/009* (2013.01); *C02F 2201/326* (2013.01); *C02F 2201/3222* (2013.01); *C02F 2209/03* (2013.01); *C02F 2209/40* (2013.01); *C02F 2303/04* (2013.01)

(58) Field of Classification Search
None
See application file for complete search history.

(56) References Cited

U.S. PATENT DOCUMENTS

| 5,916,439 | A | * | 6/1999 | Oleskow | A61L 2/10 210/198.1 |
| 2005/0247609 | A1 | * | 11/2005 | Laing | B01D 61/08 210/109 |
| 2010/0025337 | A1 | * | 2/2010 | Yencho | C02F 1/325 210/748.1 |
| 2015/0034545 | A1 | * | 2/2015 | Park | C02F 1/003 210/251 |
| 2017/0129795 | A1 | * | 5/2017 | Singh | B01D 61/025 |

* cited by examiner

*Primary Examiner* — Richard C Gurtowski
(74) *Attorney, Agent, or Firm* — Moser Taboada

(57) ABSTRACT

A portable water treatment system comprising a water processing unit that automatically determines whether the system is connected to a pressurized water source or not. If an unpressurized source is detected, the system activates a pump to ensure that the water flows through the system at a pressure level to remove particulates and ensure the ultraviolet (UV) light is effective at neutralizing viruses and bacteria. If the water source is pressurized, the pump is deactivated and the water flows through the system under the pressure of the pressurized source. The system uses a failsafe mechanism to 1) ensure that water cannot flow through the water treatment unit if the UV light chamber is not powered and 2) ensure the user can know that the UV light is in fact functioning through the use of an indicator.

20 Claims, 4 Drawing Sheets

PORTABLE WATER TREATMENT SYSTEM

CROSS-REFERENCE TO RELATED APPLICATIONS

This application claims benefit of U.S. Provisional Patent Application Ser. No. 62/847,743, filed May 14, 2019, which is herein incorporated by reference in its entirety.

BACKGROUND

Field

Embodiments of the present invention generally relate to a portable water treatment system and, more particularly, water treatment systems that treat water from a pressurized water source or an unpressurized water source.

Description of the Related Art

Water treatment systems generally comprise a filtration element to remove large particulate matter from the water coupled with an ultra-violet (UV) light source to irradiate the filtered water. The UV light eradicates living organisms such as viruses and/or bacteria rendering them harmless.

Commercially available portable water treatment systems typically use a filtration element or a UV light source. The size limitations on portability make it difficult to produce a truly portable treatment system containing both a filtration element and a UV light source. Consequently, systems having both filtration and UV are large and bulky, i.e., the available systems are typically not very portable.

Furthermore, available treatment systems are generally designed to receive pressurized water to ensure water flows through the filtration element. Such pressurized water typically comes from a household or municipal supply or is supplied from an external pump. Adding a pump to a portable water treatment system adds to the size and bulk of the system rendering it even less portable.

Systems that use UV light for water purification may, at times, have the UV light source fail or the power to the water treatment system fail. Upon either occurrence, the water from the system is not safe to drink. However, a user will not know that the UV light source has failed. The result can be illness or death for the person that unknowingly drinks the unpurified water.

Therefore, there is a need in the art for a truly portable water treatment system that handles both pressurized and unpressurized water supplies as well as comprises both a filtration element and a UV light source, where the UV light source includes a failsafe mechanism.

SUMMARY

Embodiments of the present invention include a water filtration and purification system comprising a water processing unit. The water processing unit comprises an inlet, a pump assembly and an outlet. The pump assembly comprises a pump and a pressure activated switch, where the pressure activated switch activates the pump when water pressure at the inlet is below a pressure threshold and does not activate the pump when water pressure at the inlet is above the pressure threshold. The water processing unit further comprises a filtration chamber, coupled to the pump assembly, for filtering water and an ultraviolet chamber, coupled to the filtration chamber, for purifying the filtered water. An enclosure is configured to support and enclose the water processing unit and form a portable water filtration and purification system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention include a portable water treatment system comprising a water processing unit that automatically determines whether the system is connected to a pressurized water source or not. If an unpressurized source is detected, the system activates a pump to ensure that the water flows through the system at a pressure level to remove particulates and ensure the UV light is effective at neutralizing viruses and bacteria. If the water source is pressurized, the pump is deactivated and the water flows through the system under the pressure of the pressurized source. An embodiment of the invention uses a failsafe mechanism to 1) ensure that water cannot flow through the water treatment unit if the UV light chamber is not powered and 2) ensure the user can know that the UV light is in fact energized and functioning through the use of a visual indicator.

Figure 1:
FIG. 1 is a perspective view of an embodiment of the present invention.

FIG. 1 depicts a perspective view of an embodiment of the invention. In the depicted embodiment, the water treatment system 100 comprises an enclosure 102 having a handle 104 for carrying the portable system 100. The enclosure 102 has a clam-shell form with at least one hinge (two are shown 106A and 106B) on one edge 108 and at least one latch (two latches 110A and 110B are shown) located on the edges 112a and 112B. Of course, any arrangement of hinges and latches, or none at all, are possible to facilitate access to the internal filtration and purification elements retained within the enclosure 102. The enclosure 102 is generally fabricated from plastic or other light weight, resilient material that enhances the portability of the system 100 and resists damage. The size, weight and handle 104 of the enclosure 102 enable the system 100 to be portable, i.e., a person can carry the enclosure 102 by the handle 104 using one hand. In one exemplary embodiment, the enclosure 102 is about 12.4 inches long (edge 108), about 9.8 inches wide (edge 110A) and about 8 inches deep, and weighs about 10 lbs when dry.

The enclosure 102 further defines an inlet aperture 114 and an outlet aperture 116. A pipe 118 (inlet) and 120 (outlet) passes through each respective aperture 114 and 116. The tubes 118 and 120 have hose fittings 122 and 124 formed on the ends of the pipes 118/120 to facilitate attachment of external hoses (not shown), e.g., garden type hoses with hose fittings matching the fittings of the pipes 118/120. Other types of fittings may be used such as quick connect fittings.

Figure 2:
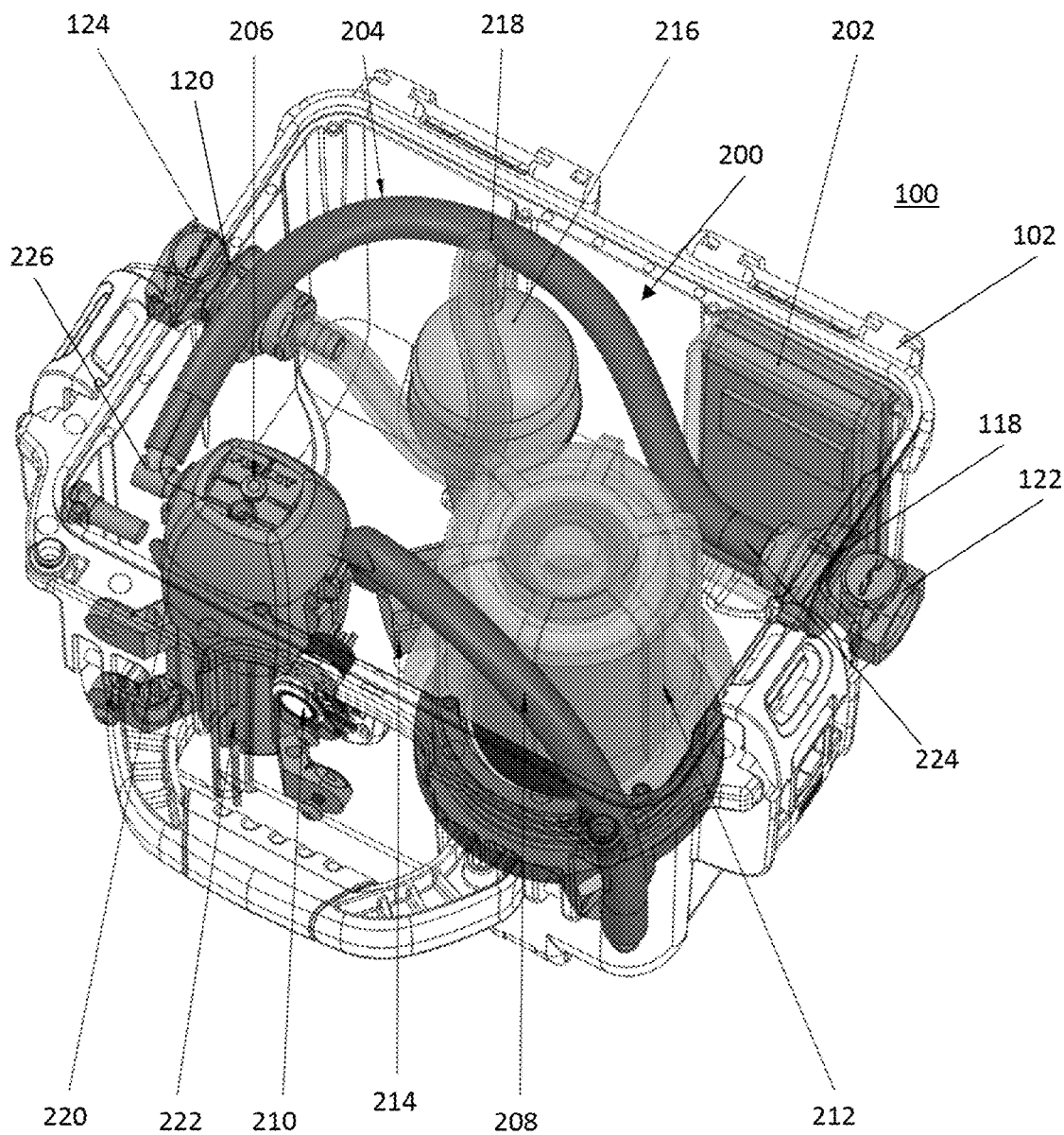
FIG. 2 is a view of the embodiment of FIG. 1 with a transparent enclosure to show components of the embodiment.

FIG. 2 depicts a perspective view of the system 100 of FIG. 1 having the enclosure 102 shown in outline (invisible) form such that the water processing unit 200 is visible. The system 100 comprises the enclosure 102 as well as the water processing unit 200 that is retained within and supported by the enclosure 102.

With respect to FIG. 2, the main components shall be identified; however, details of the component functions shall be described with respect to a schematic of the water processing unit in FIG. 3 below. The enclosure 102 encloses and supports the water processing unit 200 comprising a DC power supply (e.g., a battery) 202, inlet fitting 122, an inlet pipe 118, an inlet tube 204, a pressure sensing pump switch 206, a connecting tube 208, an operators electrical switch 210, a fine particle filtration chamber 212, a normally closed DC solenoid valve 214, a light emitting diode (LED)-based ultraviolet light purification chamber 216, an outlet tube 218, a pump assembly 220, pump motor 222, the outlet pipe 120 and the outlet fitting 124. The inlet pipe 118 is coupled to the inlet tube 204 using a well-known press fit-type coupler 224 and the inlet tube 204 is coupled to the pump assembly 220 through an elbow coupler 226. An outlet of the pump assembly 220 is coupled to an inlet to the particle filter chamber 212. An outlet of the particle chamber 220 is coupled to an inlet of the UV light purification chamber 216 (UV chamber) via the solenoid valve 214. As part of the failsafe mechanism, the solenoid valve 214 ensures that no water will pass through the water processing unit 200 unless the UV chamber 216 is energized. An outlet of the UV chamber 216 is coupled via the outlet tube 218 to the outlet pipe 120. The DC power supply 102 is used to power a UV light emitting diode (LED) array in the UV chamber 216 as well as power the pump motor 222 of the pump assembly 220. The power switch 210 couples DC power to the pump assembly and the UV LEDs as shall be described below. The UV LED array features a fast (nearly instantaneous) turn on and off time, low power consumption, and small form factor.

The outlet tube 218 is transparent. The UV LED array within the UV chamber 216 produces some visible light in addition to UV light. By using a transparent tube, a user can visually see that the UV chamber 216 is operational by looking at the outlet tube. As such, the outlet tube provides a direct visual indicator of the proper functioning of the UV chamber 216 as part of the failsafe mechanism.

Water to be filtered and purified flows through the inlet pipe 118 to the pump assembly 220. If the water is pressurized, the pump assembly will not activate; however, if the water is unpressurized, the pump assembly activates to ensure sufficient water pressure is applied to the particle chamber 212 and that a proper rate of flow passes through the UV chamber 216 to neutralize any pathogens in the water. Once the water is filtered and purified, the water passes through the outlet tube 218 and pipe 120 to exit the system 100. If, for any reason, power is not applied to the UV chamber 216, the solenoid will not open and no water will pass through the system 100.

Figure 3:
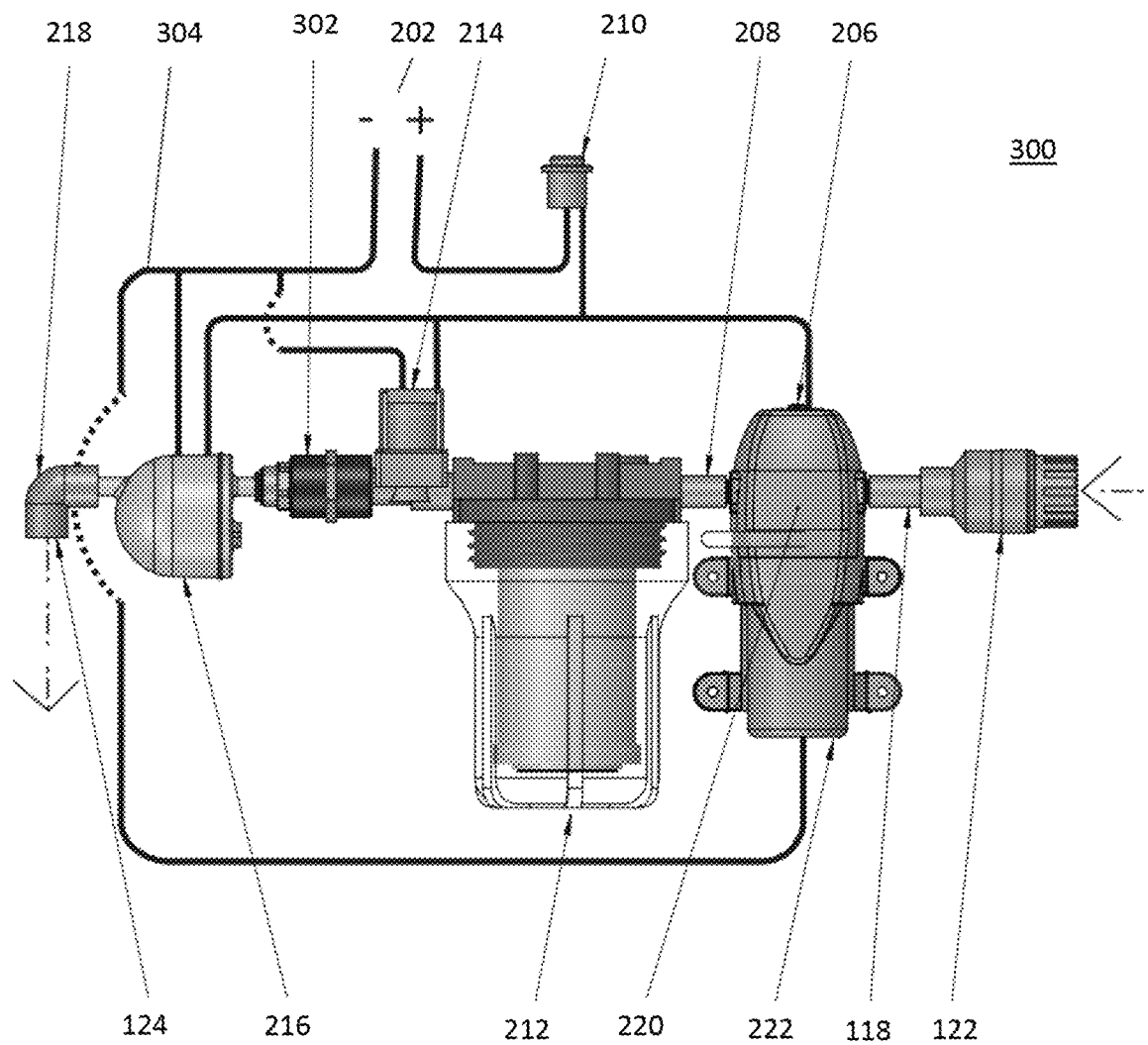
FIG. 3 is a schematic diagram of one embodiment of the invention shown in a linear arrangement.

FIG. 3 depicts a simplified, schematic view of a water processing unit 300 showing water movement through the unit 300. The unit 300 is functionally the same as the unit 200 except the component layout is linear to clearly show the water flow through the unit 200/300 as well as show the electrical connections for powering the unit 200/300. The common reference numerals used in FIG. 2 are used in FIG. 3. The components of FIG. 2 are represented in FIG. 3 and connected in the same order as described with respect to FIG. 2 above.

Pressurized water from a water source (not shown) enters through the fitting 122 and is coupled to the water pump assembly 220. The water pump assembly 220 comprises a pressure sensing pump switch 206 that is integrated into the pump assembly 220 and an electric motor 222 that actuates a diaphragm pump to pump water through the unit 300. The pressure sensing switch 206 automatically controls the electrical current flow to the pump motor 222. The pressure sensing switch 206 monitors pressure in the pump assembly 220 and activates the pump motor 222 when the inlet water pressure is below a threshold or does not activate the motor 222 if the inlet water pressure is below a threshold. In one embodiment, the threshold is about 22 psi. In one embodiment, the pump assembly is model PAR Max 1+ available from Xylem.

In general terms, the pump assembly increases water having first pressure to a second pressure, where the second pressure is higher than the first pressure. The pressure sensing switch operates as a combination of a sensor and a controller such that, when the water pressure at the inlet is greater than a threshold level, the switch (controller) does not activate the pump and, when the water pressure at the inlet is below the threshold level, the switch (controller) activates the pump. In one embodiment the combination is a pressure activated switch. In other embodiments, the combination could be a sensor and a controller (such as a microcontroller).

The water pump assembly outlet is connected by a tube 208 to a particle filtration chamber 212. The particle filtration chamber outlet is plumbed to a normally closed solenoid valve 214. The solenoid valve 214 is connected via standard plumbing connection 304 (hidden in FIG. 2) to an UV purification chamber 216. As part of the failsafe mechanism, the solenoid valve 214 controls the water flow between the particle filtration chamber 212 and the ultraviolet purification chamber 216. The outflow of the ultraviolet purification chamber 216 is connected to a plumbing fitting 124. An electrical circuit (represented by lines 304) is completed when switch 210 is engaged (closed). Upon closing the switch 210 DC power is provided from the source (battery) 202 to the pump motor 222, to the solenoid valve 214 and the ultraviolet purification chamber 216. In one embodiment, the system operates using a DC power source 202, e.g., a battery. In other embodiments, an AC-DC converter may be used to provide power directly to the components and/or charge the battery.

Filtration is accomplished by flowing water through the fine particle filtration chamber 212, thereby physically screening sediment or contaminants. In one embodiment, the filter 212 has a pore size of, for example, 0.5 microns. As such, the filter 212 removes material larger than the 0.5 micron filter pore size. Additionally, this filter 212 can absorb bad taste, odors, and a variety of chemical impurities. One exemplary filter is CBC-5 available from Pentek.

Microbiological purification of the water is accomplished by flowing the water through the LED ultraviolet purification chamber 216 to inactivate hazards such as bacteria, viruses, and protozoa to complete the treatment of the water for human consumption. The UV chamber 216 is activated by illuminating LEDs that emit ultraviolet wavelength light when supplied with DC power. The UV chamber 216 contains at least one LED array that produces a minimum of 10 mJ/cm^2 amount of UV radiation to treat 1.1 gallon per minute of water. For example, the UV chamber is model 12

C Pearl Aqua available from Aquisense Technologies LLC. As part of the failsafe mechanism, the visible light produced by the array is visible to a user via transparent tube 218.

The filtration chamber 212 supports the effectiveness of the ultraviolet purification step by removing particles that could block ultraviolet rays from penetrating the water column in the UV chamber 216.

In alternative embodiments of the invention, external components may be added to regulate water flow or to provide pre-filtering of large particles. For example, the 0.5 micron pore size of the fine particle filter element in combination with an external 50 psi pressure regulator provide a pressure drop to control flow rate through the ultraviolet purification chamber 216. Such a flow regulator may be attached to the inlet fitting 122 to establish a specific flow rate when using a pressurized water source. When a unpressurized source is used, such as a river or lake, an external large sediment 5 micron prefilter may be used at the inlet 122 to remove large particles of sediment that may clog the filtration chamber 212. The regulator and pre-filter are optional accessories to the portable water treatment system 100.

The pump assembly 220 is provided to, when necessary, create water pressure through the unit 200/300 to produce flow at an appropriate pressure for the filtration chamber 212 and UV chamber 216 to function properly. The pump assembly 220 has a pressure sensing switch 206 that turns on the pump motor 222 when the pressure sensing switch 206 detects low pressure at the pump inlet 118 (e.g., pressure below a predefined threshold). The default for the pump assembly 220, when supplied with power, and detecting low pressure, is to pressurize the pump outflow up to a set maximum pressure value, e.g., about 35 psi. Thus, when DC power is coupled to the pump assembly 220 via the system switch 210, the pressure sensing switch 206 must also close to activate the pump motor 220. In this scenario, the pump assembly 220 will continue to run until the operator switch 210 is toggled to open (OFF), thereby removing DC power from the closed pressure sensing switch 206. In this manner, the water processing unit 200/300 facilitates dual mode functionality with one button user input by automatically toggling between the pressurized and unpressurized modes via the pressure switch 206 in the pump assembly 220.

Figure 4:
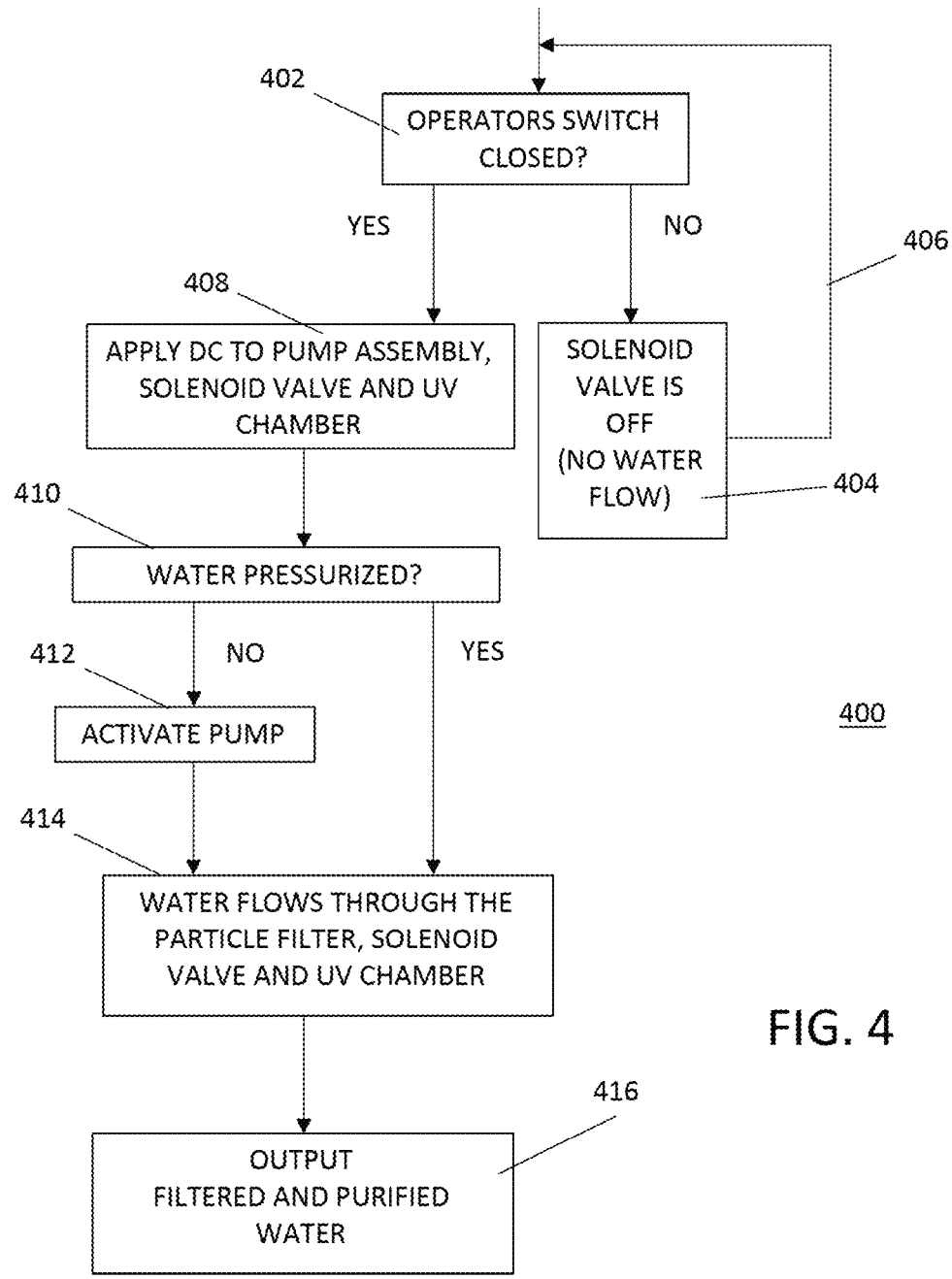
FIG. 4 is a flow diagram of the operation of the embodiment depicted in FIGS. 1, 2, and 3.

FIG. 4 depicts an operational flow diagram 400 that shows the system operation. The overall purpose of the system 100 is to prepare and treat water for human consumption. It is important that water moves through the filtration and purification components at flow rates that are controlled so that these processes can proceed at optimum effectiveness for reducing impurities and inactivating microbiological hazards. It is beneficial that the user has feedback that the purification step is functioning, and the user cannot move water through the system without the water being treated with UV light.

While describing the operational flow diagram 400, reference will be made to the physical components in FIGS. 1 and 2. The process of water treatment starts, at step 402, when the switch 210 is closed to connect DC power source 202 to the solenoid 214, the UV chamber 216, and the pump assembly 220. If the switch 210 is not closed, at step 404, the solenoid valve remains closed, blocking all flow of water through the system 100. This failsafe safety measure ensures that untreated water does not exit the system when power is not applied to the UV chamber 216. Path 406 represents that, if the operators switch 210 is not closed, the system 100 waits for the switch to be activated and no water can flow through the system.

When the switch 210 is closed, at step 408, DC power is applied to the pump assembly 220, the solenoid valve 214 and the UV chamber 216. The power causes the normally closed solenoid valve 214 to open allowing water flow to exit the particle filtration chamber 212 and flow into the ultraviolet purification chamber 216. Opening the solenoid valve 214 allows water to flow through the entire treatment process.

When the process of water treatment starts as described above by closing the operator's switch 210, DC power is also supplied to the water pump assembly 220. Specifically, power is supplied to the pump motor 222 via the integrated pressure switch 206. There are two scenarios that can follow—a pressurized mode or an unpressurized mode. At step 410, the system 100 automatically determines whether the water source is pressurized or not. If the inlet fitting 122 is connected to an unpressurized supply of water, such as a non-elevated tank, or a naturally occurring lake, at step 412, the pressure switch 206 in the pump assembly 220 will close because the ambient pressure of the water through the inlet pipe 118 and pump 40 will be below the set point for the pressure switch 206. This will close the pressure switch 206 and send apply power to the pump motor 222 to power the pump assembly 220 to pressurize water flow though the water treatment system 100. Thus, at step 414, water flows through the particle filter 212, solenoid valve 214 and UV chamber 216. At step 416, filtered and purified water from an unpressurized source exits the system.

If, at step 410, the water coming into the system inlet flitting 122 is pressurized, as from a municipal or household water supply through a faucet, the ambient pressure of the incoming water propels it through the pump assembly 220, through the particle filtration chamber 212, and through the UV chamber 216 when the solenoid valve 214 is opened. The pump 222 does not activate, because even though power is supplied to the pump assembly 220, the pressure switch 206 is not closed because ambient water pressure is above the set point threshold of the pressure switch 206. Thus, at step 414, water flows through the particle filter 212, solenoid valve 214 and UV chamber 216. At step 416, filtered and purified water from a pressurized source exits the system 100. Water flows through the water treatment system until the operator's switch 210 is opened. This causes the solenoid valve 214 to close, stopping the flow of water.

The arrangement of solenoid valve 214, particle filter 212, ultraviolet purification chamber 216, and pump assembly 220 connected as described above has the important characteristic of allowing a portable system to be capable of treating and purifying drinking water that can be used either on pressurized or non-pressurized water sources, and maintains the same simple single button operation for the user. This dual functionality makes the system useful for traveling, off grid living, and emergency survival in environments where a variety of water sources may be encountered. The user can treat water from a variety of sources including those that are available through a pressurized faucet or sources such as lakes and rivers that need to be pumped.

There is a further benefit of increased safety and reliability from this arrangement of the components to facilitate a failsafe mechanism, especially with regard to the solenoid valve 214 and the UV chamber 216. The UV chamber 216 requires that power be supplied to the LEDs to perform the function of inactivating microbiological hazards from drinking water. The fact that the solenoid valve 214 also requires power to open means that the system inherently ensures that water cannot pass through the solenoid valve 214 to the purification chamber 216 unless power is supplied to both the UV chamber 216 and the solenoid valve 214 through the operator's switch 210. This is important, because it prevents a false perception on the part of the user that any water that passes through the system has been treated. Otherwise it would be possible for water to pass through the UV chamber 216 without the LEDs illuminated, and therefore not actually inactivating microbiological hazards. The user could assume that this water has been treated by virtue of the fact that it had passed through a treatment system. An additional related safety feature is in the case of removal or failure of the power supply 202, the solenoid valve 214 performs the same function and prevents water flow that could be mistaken by the user as successfully treated water. This is important because the portable nature of the system means it will often be used with battery, solar, or generator power supplies that may be subject to poor reliability.

An additional safety feature of the failsafe mechanism is a visual confirmation of the activation of the ultraviolet LEDs in the UV chamber 216. Ultraviolet LEDs produce light that includes a portion of the visible light spectrum. By incorporating a clear light transmitting tube, it is possible for the user to visually inspect and confirm the operation of the UV LEDs inside the UV chamber. The visible portion of the emission spectrum will pass through the transparent tube and is visible to the user. This allows a simple in-field verification that the UV LEDs are indeed activated. In the embodiment of system 100, the user can view the transparent tube 218 by opening the lid of the enclosure 102. In other embodiments, the enclosure 102 may comprise a window through which the transparent outlet tube or transparent portion of the UV chamber can be viewed.

Effective ultraviolet purification requires that water flow rate through the purification chamber is below a threshold to maintain a minimum exposure of the water sample to the ultraviolet light. In one exemplary embodiment, water must be processed through the UV chamber to achieve greater than 90% UV transmittance (UV-T) of at least 10 mJ/cm^2 at 1.1 gallons per minute flow rate. In other embodiments, different levels of transmittance, irradiation levels and flow rates may be used as long as the characteristics of the UV chamber are effective at reducing pathogens in the water to non-harmful levels.

In an alternative embodiment a microcontroller could be used to replicate the logic described here via programming code. In such an embodiment, the pump assembly would be controlled by a microcontroller using a pressure sensor in the inlet. Such an arrangement of microcontroller, pressure sensor and switch would form a pressure activated switch for the pump and form part of a pump assembly to function as described above. In addition, a microcontroller may also use a UV sensor to ensure the UV chamber was illuminated before opening the solenoid valve.

An alternative embodiment includes placing the pressure sensor in a location that is independent of the pump, i.e., in any location upstream of the solenoid valve. In this alternate location, the pressure sensor would relay switching information from outside of the pump assembly. However, it would accomplish the same function of controlling the pump motor relative to the need to generate pressure to move water through the water treatment system.

The plumbing features the inlet, connective tubes and outlet serve the function of connecting the critical components the pump, particle filter, solenoid, and UV chamber. The plumbing features are not specific to the system design, and may take other forms, although this design envisions this system as portable, and thus the components should remain in proximity to each other. Additionally, there may be quick dis-connect plumbing fittings at the inlet and outlet of the system. The inlet and outlet may have automatic shut off valves to close when not in use.

The form factor of the operator's switch is optional. This system design only envisions that the switch connects the power source to the components of the system.

The specific form factor of the enclosure is optional or not required to the functionality of the system, except to be sized to be portable.

While the foregoing is directed to embodiments of the present invention, other and further embodiments of the invention may be devised without departing from the basic scope thereof, and the scope thereof is determined by the claims that follow.

The invention claimed is:

1. A water filtration and purification system comprising:
a water processing unit comprising:
a pump assembly comprising an inlet, an outlet, a pump and a pressure activated switch, where the pressure activated switch activates the pump when water pressure at the inlet is below a pressure threshold and does not activate the pump when water pressure at the inlet is above the pressure threshold, if the water pressure is above the pressure threshold, the pump is configured to allow water to flow through the pump assembly to the outlet without the pump being activated and, if the water pressure is below the pressure threshold, the pump is configured to increase the water pressure of water flowing through the pump assembly to the outlet;
a filtration chamber, coupled to the pump assembly, for filtering water flowing from the pump assembly outlet; and
an ultraviolet chamber, coupled to the filtration chamber, for purifying the filtered water; and
an enclosure configured to support and enclose the water processing unit and form a portable water filtration and purification system.

2. The water filtration and purification system of claim 1 wherein the water processing unit further comprises a failsafe mechanism configured to ensure that water does not pass through the water processing unit without an ultraviolet light source being activated within the ultraviolet chamber.

3. The water filtration and purification system of claim 2 wherein the failsafe mechanism comprises a normally closed solenoid valve located between the filtration chamber and the ultraviolet chamber.

4. The water filtration and purification system of claim 1 further comprising a means for viewing that the ultraviolet chamber is functioning.

5. The water filtration and purification system of claim 4 wherein the means for viewing comprises a transparent tube coupling the ultraviolet chamber to the outlet.

6. The water filtration and purification system of claim 1 further comprising a pressure regulator coupled to the inlet.

7. The water filtration and purification system of claim 1 further comprising a large particle filter coupled to the inlet.

8. The water filtration and purification system of claim 1 further comprising a failsafe mechanism for blocking water flow when the ultraviolet chamber is not energized and for providing a visual indicator of when the ultraviolet chamber is energized.

9. The water filtration and purification system of claim 1 wherein the ultraviolet light chamber comprises at least one light emitting diode array configured to produce ultraviolet light.

10. A water filtration and purification system comprising
a water inlet configured for coupling to a water source, where a water pressure of the water source having a first pressure;
a pump, coupled to the water inlet, configured to increase the water pressure from the first pressure to a second pressure when the first pressure is less than the second pressure and, if the first pressure is greater than the second pressure, allow water to pass through the pump without having the pump increase the water pressure;
a pressure sensor, coupled to the water inlet, for detecting the water pressure;
a controller, coupled to the pressure sensor and the pump, for determining when the first pressure is less than the second pressure and causing the pump to increase the water pressure when the first pressure is less than the second pressure;
a filtration chamber, coupled to the pump, for removing particulates from the water to form filtered water;
an ultraviolet chamber for applying ultraviolet light to the filtered water to produce purified water;
a water outlet for allowing egress of the purified water; and
an enclosure for supporting the water inlet and water outlet, sized to enclose the pump, pressure sensor, controller, filtration chamber and ultraviolet chamber and form a portable system.

11. The water filtration and purification system of claim 10 further comprising a failsafe mechanism configured to ensure that water does not pass through the ultraviolet chamber without an ultraviolet light source being activated within the ultraviolet chamber.

12. The water filtration and purification system of claim 11 wherein the failsafe mechanism comprises a normally closed solenoid valve located between the filtration chamber and the ultraviolet chamber.

13. The water filtration and purification system of claim 10 further comprising a means for viewing that the ultraviolet chamber is functioning.

14. The water filtration and purification system of claim 13 wherein the means for viewing comprises a transparent tube coupling the ultraviolet chamber to the water outlet.

15. The water filtration and purification system of claim 10 further comprising a pressure regulator coupled to the water inlet.

16. The water filtration and purification system of claim 10 further comprising a large particle filter coupled to the water inlet.

17. The water filtration and purification system of claim 10 further comprising a failsafe mechanism for blocking water flow when the ultraviolet chamber is not functioning and for providing an indicator of when the ultraviolet chamber is functioning.

18. The water filtration and purification system of claim 10 wherein the ultraviolet chamber comprises at least one light emitting diode array configured to produce ultraviolet light.

19. A method of operation of a portable water filtration and purification system comprising:
upon activation of an operator's switch, applying power to a pump assembly, a normally closed solenoid valve, and an ultraviolet chamber to enable water to flow through the pump assembly, a filtration chamber, the normally closed solenoid valve and ultraviolet chamber;
sensing whether water pressure at an inlet of the system is above a threshold level;
if the water pressure at the inlet is above the threshold level, not activating a pump and allowing water to flow through the pump assembly, and if the water at the inlet is below the threshold level, activating the pump to increase the water pressure of water flowing through the pump assembly;
filtering the water from the pump assembly to create filtered water;
purifying the filtered water using the ultraviolet chamber; and
disengaging the normally closed solenoid valve stopping the flow of water through the ultraviolet chamber if the ultraviolet chamber is receiving power.

20. The method of claim 19 further comprising providing a viewable indicator that the ultraviolet chamber is energized.

\* \* \* \* \*